(12) United States Patent
Altwegg

(10) Patent No.: US 12,091,246 B2
(45) Date of Patent: Sep. 17, 2024

(54) STORAGE DEVICE FOR STORING TRANSPORT UNITS

(71) Applicant: FERAG AG, Ch-8340 Hinwil (CH)

(72) Inventor: Heinz Altwegg, Fehraltorf (CH)

(73) Assignee: FERAG AG, Hinwil (CH)

( * ) Notice: Subject to any disclaimer, the term of this patent is extended or adjusted under 35 U.S.C. 154(b) by 726 days.

(21) Appl. No.: 17/289,656

(22) PCT Filed: Oct. 28, 2019

(86) PCT No.: PCT/EP2019/079416
§ 371 (c)(1),
(2) Date: Apr. 28, 2021

(87) PCT Pub. No.: WO2020/089177
PCT Pub. Date: May 7, 2020

(65) Prior Publication Data
US 2021/0403234 A1 Dec. 30, 2021

(30) Foreign Application Priority Data

Oct. 31, 2018 (CH) ........................... 1328/18

(51) Int. Cl.
*B65G 1/04* (2006.01)
*B07C 5/10* (2006.01)
(Continued)

(52) U.S. Cl.
CPC .............. *B65G 1/0457* (2013.01); *B07C 5/10* (2013.01); *B65G 17/20* (2013.01); *B65G 17/485* (2013.01);
(Continued)

(58) Field of Classification Search
CPC .... B65G 1/0457; B65G 17/20; B65G 17/485; B65G 43/08; B65G 47/641;
(Continued)

(56) References Cited

U.S. PATENT DOCUMENTS 5,971,131 A * 10/1999 Blattner ................. B65G 43/08
198/349.95
6,704,613 B2 3/2004 Gomez
(Continued)

FOREIGN PATENT DOCUMENTS

DE 195 05 509 A1 8/1996
DE 297 18 342 U1 2/1998
(Continued)

OTHER PUBLICATIONS

EPO (Riswijk, NL), English language version of the International Search Report, Form PCT/ISA/210, for International Application PCT/EP2019/079416, Feb. 10, 2020 (03 pages).

*Primary Examiner* — Thomas Randazzo
(74) *Attorney, Agent, or Firm* — Pauley Erickson & Swanson

(57) ABSTRACT

A storage device (1') for storing transport units (3') includes a number of transport units (3'), a number of storage lines (12a'-12g') which are configured to store transport units (3'), a feeding line (11') which is connected by a respective first switch point (111') to the storage lines (12a'-12g'), a measuring device (15') which is arranged on the feeding line (11') and which is configured to determine a respective extent of a transport unit (3'), and a controller (16') which is connected to the measuring device (15') and to the first switch pointes (111') and which is configured to select a (Continued)

storage line (12a'-12g') for storing the transport unit (3') on the basis of the extent of the transport unit (3') determined by the measuring device (15').

27 Claims, 9 Drawing Sheets

(51) Int. Cl.
  *B65G 17/20* (2006.01)
  *B65G 17/48* (2006.01)
  *B65G 43/08* (2006.01)
  *B65G 47/61* (2006.01)
  *B65G 47/64* (2006.01)

(52) U.S. Cl.
  CPC ............ *B65G 43/08* (2013.01); *B65G 47/61* (2013.01); *B65G 47/641* (2013.01); *B65G 2203/0216* (2013.01); *B65G 2203/0283* (2013.01); *B65G 2203/044* (2013.01)

(58) Field of Classification Search
  CPC .... B65G 2203/0216; B65G 2203/0283; B65G 2203/044; B65G 47/5109; B65G 2201/0229; B65G 2203/0266; B65G 47/61; B65G 2203/041; B65G 2203/046; B07C 5/10; B65H 29/003; B65H 29/60; B65H 2220/01; B65H 2511/10
  See application file for complete search history.

(56) References Cited

U.S. PATENT DOCUMENTS

| | | | | |
|---|---|---|---|---|
| 2012/0193307 A1* | 8/2012 | Gardelle | .................. | B65G 1/08 |
| | | | | 211/13.1 |
| 2013/0264171 A1* | 10/2013 | Wend | ..................... | B65G 47/29 |
| | | | | 198/459.6 |
| 2014/0303770 A1* | 10/2014 | Wend | ................... | B65G 1/1376 |
| | | | | 700/215 |
| 2015/0210482 A1* | 7/2015 | Sieksmeier | ............ | B65G 43/08 |
| | | | | 700/230 |
| 2015/0274425 A1* | 10/2015 | Wend | ................... | B65G 47/648 |
| | | | | 104/88.01 |
| 2017/0283173 A1* | 10/2017 | Otto | ..................... | B65G 19/025 |
| 2018/0346242 A1* | 12/2018 | Grosse | ................. | B65G 1/0414 |
| 2019/0210800 A1* | 7/2019 | Holas | .................. | B65G 1/0457 |
| 2020/0062515 A1* | 2/2020 | Ramseier | ............... | B65G 47/61 |
| 2020/0247610 A1* | 8/2020 | Mathi | ................... | B65G 1/1376 |

FOREIGN PATENT DOCUMENTS

| | | |
|---|---|---|
| DE | 10 2006 044 137 B3 | 2/2008 |
| DE | 10 2010 022 082 A1 | 12/2010 |
| DE | 10 2010 053 590 A1 | 6/2012 |
| DE | 10 2011 055 780 A1 | 5/2013 |
| DE | 10 2016 105 716 A1 | 10/2017 |
| EP | 0 620 528 A1 | 10/1994 |
| EP | 2 366 463 A1 | 9/2011 |
| EP | 2 647 588 A1 | 10/2013 |
| EP | 3 251 990 A1 | 12/2017 |
| WO | WO 2014/009138 A1 | 1/2014 |

\* cited by examiner

STORAGE DEVICE FOR STORING TRANSPORT UNITS

CROSS REFERENCE TO RELATED APPLICATION

This application is a National Phase filing in the United States, under 35 USC § 371, of PCT International Patent Application PCT/EP2019/079416, filed on 28 Oct. 2019 which claims the priority of Swiss Patent Application CH 01328/18, filed 31 Oct. 2018.

These applications are hereby incorporated by reference herein in their entirety and is made a part hereof, including but not limited to those portions which specifically appear hereinafter.

BACKGROUND OF THE INVENTION

Field of the Invention

The present invention is directed to the intralogistics sector and relates to a storage device for storing transport units and to a method for operating such a storage device.

Discussion of Related Art

In intralogistics, use is made of various devices for conveying items for transport, wherein the items for transport are typically conveyed by means of suitable transport units. One aspect in intralogistics relates here to the storage of transport units in one or more stores. In particular, the store may be a temporary store in which transport units are stored for a certain period of time and released from storage again for onward conveyance when required. With suitable temporary stores, it is for example possible to perform sorting operations, which plays an important role in the order-picking of goods, in particular.

Depending on requirements, the transport units may be conveyed in a conveying device with fixed spacings to one another or with variable spacings, for example in buffer sections. To increase the conveying rate and/or the order-picking rate, it is desirable here to attain the most optimum possible capacity utilization of the conveying device. Aside from a space-saving arrangement of the transport units with the smallest possible spacing to one another, the greatest possible utilization of the available space in a store constitutes an important factor for optimizing the capacity utilization.

One example of a conveying installation with carrying bags, in the case of which the space requirement of the carrying bags is taken into consideration, is described in DE 102010053590 A1. The carrying bag comprises a hanging point for a bag pouch for accommodating items for conveying, wherein the bag pouch has a dimension which assumes a smallest value in an empty state and assumes a maximum value in a state in which it is laden with the items for conveying. The carrying bag furthermore comprises a spacer which is pivotable between the hanging point and the bag pouch and which is positionable in a stable rest position or in a stable working position, wherein the spacer is designed such that, in its working position, it comes into contact with a carrying bag following behind and is dimensioned such that a spacing measured in the horizontal is set. The embodiment of the carrying bag with a settable spacer allows optimum space utilization both in the backing-up of empty carrying bags with spacers situated in the rest position and in the backing-up of laden carrying bags with spacers situated in the working position.

SUMMARY OF THE INVENTION

It is therefore an object of the invention to provide a storage device and a method for operating a storage device of said type, which at least partially improve the prior art with regard to the storage of transport units.

Said objective is achieved by means of the features of the independent claims. Preferred embodiments of the invention are specified in the dependent claims and in the present description and the figures.

The invention relates to a storage device for storing transport units, comprising a number of transport units, a number of storage lines which are configured to store transport units, a feeding line which is connected by means of a respective first switch point to the storage lines, a measuring device which is arranged on the feeding line and which is configured to determine a respective extent of a transport unit, and a controller which is connected to the measuring device and to the first switch pointes. The controller is configured to select a storage line for storing the transport unit on the basis of the extent of the transport unit determined by the measuring device.

The invention offers the advantage that the storing of the transport units in the storage lines can be adapted to the extent of the transport units to be stored. Since the extent of the transport units is determined prior to storage by means of the measuring device, it is for example not necessary to assume a particular average extent or a particular maximum extent of the transport units in order to control the storage of the transport units in the storage lines.

With the assumption of an average extent, although a certain average capacity utilization of the storage lines is made possible, it is however for example not possible to prevent attempts from being made to store transport units with a large extent in the conveying direction in storage lines in which the space is not sufficient for these transport units. In the case of such an operation, it may arise that a respective transport unit cannot be stored in a storage line and, instead, becomes caught in a first switch point which connects the feeding line to the storage line.

The assumption of a maximum extent of the transport units can duly provide a remedy in this regard, by virtue of the fact that it is always ensured that storage is performed only in those storage lines in which there would be space for transport units with the assumed maximum extent. This can however typically have the result that too much space is kept free in the storage lines, which has a disadvantageous effect on capacity utilization.

Since, for each transport unit to be stored, the extent thereof is determined prior to storage, and the storage line for storing the transport unit is selected on the basis of the determined extent of said transport unit, the capacity utilization of the storage lines can be continuously optimized. Each transport unit can thus be stored in a dynamic and selective manner, that is to say, for each transport unit, the most optimum storage line at the present point in time, for example the storage line with suitable free space, can be selected. The determined extent on the basis of which the controller selects a storage line may be an extent in the conveying direction and/or transverse with respect to the conveying direction.

The measuring device preferably comprises a communication unit which is configured to form a communication connection with the controller in order to be able to transmit the determined extents to the controller. The communication connection may, in one embodiment, be of wireless configuration.

In one embodiment, the measuring device is configured to determine the extent of a transport unit in the conveying direction.

The measuring device preferably comprises a sensor which is configured to measure the extent of the transport units. In embodiments, the sensor may be an optical sensor, for example a camera, a light barrier, a light curtain, a light grid, a light scanner or the like.

In particular, the optical sensor may be a reflection-type light scanner.

The light barrier may for example be a one-way light barrier or a reflection-type light barrier.

In particular embodiments, the sensor may be configured as a mechanical or electromagnetic sensor which, by mechanical or electromagnetic contact with the transport unit, can determine the extent thereof.

In one embodiment, the measuring device comprises a number of optical sensors, for example light barriers or light scanners, which are arranged one above the other in a vertical direction. This has the advantage that the extent of a transport unit at different heights of the transport unit can be measured. In particular, in the case of transport units with an extent in the conveying direction and/or transversely with respect to the conveying direction which varies in a manner dependent on the height, for example in the case of transport units comprising sack-like bags, the varying extent of the transport unit can advantageously be measured by means of the number of sensors.

Alternatively, or in addition, the measuring device may comprise a number of optical sensors, for example light barriers or light scanners, which are arranged adjacent to one another in a horizontal direction. In particular, the measuring device may comprise a number of optical sensors which are arranged so as to form a matrix. By means of a matrix arrangement, it is possible, in addition to the determination of the extent of the transport unit, to determine further geometrical characteristics of the transport unit, such as for example the spatial position. For example, it is thus possible for an inclination of a bag to be determined, and this inclination can also be taken into consideration in the determination of the extent of the transport unit or of the bag.

In one embodiment, the measuring device comprises a guiding device which is configured to stabilize a transport unit during the determination of the extent by the measuring device. By means of the stabilization of the transport unit, for example by reduction of oscillatory movements of a hanging transport unit, the measurement accuracy in the determination of the extent of the transport unit can be increased. In particular, the guiding device can dampen a movement, for example an oscillatory movement, of a transport unit.

The guiding device preferably comprises at least one limiting body which is configured to limit a movement of the transport unit, preferably an oscillatory movement, preferably horizontally transversely or longitudinally with respect to the conveying direction. By means of the limiting of the movement of the transport unit, the stabilization of the transport unit can be improved.

In one embodiment, the guiding device comprises two limiting bodies which are arranged opposite one another and which are configured to limit the movement of the transport unit in both horizontal directions transversely with respect to the conveying direction.

The limiting bodies may be arranged on respectively opposite sides of the feeding line.

In one embodiment, the guiding device is configured to move the transport unit along in the conveying direction. The guiding device can advantageously stabilize the transport unit, the extent of which is to be determined by the measuring device, and along move said transport unit in the conveying direction, simultaneously.

In one embodiment, the guiding device comprises a drive which is configured to drive the guiding device for moving the transport unit along.

In one embodiment, the limiting body comprises a belt which circulates over at least two rollers and which is preferably configured to limit a movement of the transport unit transversely with respect to the belt.

In one embodiment, the belt is configured to convey the transport unit in the conveying direction, or to assist the conveying movement, by means of the circulating movement over the rollers. For example, the belt may, in a subsection of the belt, lie against a surface of the transport unit, for example a lateral wall of a bag, and move the transport unit along in the conveying direction.

In one embodiment, the belt is configured to run along with the transport unit by way of the circulating movement over the rollers. For example, the belt may, in a subsection of the belt, lie against a surface of the transport unit, for example a lateral wall of a bag, and run along with the transport unit in the conveying direction.

The subsection of the belt preferably runs parallel to the conveying direction of the transport unit.

In one embodiment, the drive is configured to drive at least one of the rollers. The belt can be driven through the driving of the rollers. The drive has the advantage that the guiding device can take over the conveying of the transport unit in the region of the measuring device and convey said transport unit through the measuring device.

Through adaptation of the rotational speed of the rollers by means of the drive, the conveying speed of the transport unit which is moved along by the belt of the guiding device can be adapted to requirements of the measuring device.

For example, the conveyance of the transport unit may be slowed in the region of the measuring device in order to allow or improve a reliable measurement of the extent of the transport unit by an optical sensor of the measuring device.

Alternatively, the rollers may be rotatable in a non-driven manner, and/or the belt may be mounted so as to run freely over the rollers. Owing to the free mounting, the belt can run conjointly with a transport unit moving through the measuring device and can stabilize the transport unit without driving the latter.

In the context of the present invention, the term "belt" may encompass objects such as for example bands, chains, cables, carpet etc.

The belt may stabilize the transport unit and/or, move it along in the conveying direction, by lying directly against the transport unit. Alternatively, the belt may comprise a stabilizing structure and/or a carrier structure. The stabilizing structure and/or carrier structure may be arranged between belt and transport unit and may abut against the transport unit or make contact with the transport unit.

In one embodiment, the belt comprises, as stabilizing structure and/or carrier structure, brushes which are arranged on an outer surface of the belt and which are configured to stabilize the transport unit and advantageously move the latter along in the conveying direction.

In a further embodiment, the belt comprises, as stabilizing structure and/or carrier structure, foam elements which are arranged on an outer surface of the belt.

The brushes and/or foam elements preferably exhibit flexibility such that the brushes and/or foam elements can adapt to different geometries and/or dimensions of the transport units. The brushes and/or foam elements may be configured such that the brushes and/or foam elements lie against the outer surface of the belt when the belt is at a standstill and stand upright from the outer surface of the belt during a movement of the belt over the rollers.

The guiding device is preferably configured such that the belt is arranged laterally with respect to the transport unit and the movement of the transport unit in a horizontal direction is limited.

In one embodiment, the guiding device comprises two separate, oppositely arranged belts which each run over at least two rollers and which are configured to limit the movement of the transport unit in both horizontal directions transversely with respect to the conveying direction.

The guiding device may alternatively or additionally comprise a belt which is arranged below the transport unit and on which the transport unit may at least partially lie directly or indirectly, for example via brushes and/or foam elements arranged on the belt, for stabilization purposes.

In one embodiment, the guiding device comprises a number of limiting bodies which are configured as brush rollers, wherein at least two brush rollers are arranged so as to adjoin one another and form a stabilizing surface and/or guide surface.

In one embodiment, at least two first brush rollers are arranged on one side of the feeding line and at least two second brush rollers are arranged on an opposite side of the feeding line such that a transport unit can be led through and stabilized between the oppositely situated brush rollers.

One aspect of the invention furthermore relates to a measuring device according to the present description for a storage device for storing transport units in a number of storage lines, which measuring device is configured to determine a respective extent of a transport unit. On the basis of the determined extent, a storage line for storing the transport unit can be selected.

The extent of the transport unit may be determined inter alia vertically and/or horizontally transversely with respect to the conveying direction and/or along the conveying direction. In the case of transport units with bags, the extent to be determined may be the depth, width and/or the height of the bag.

In one embodiment, the present number of transport units stored in the respective storage lines, the extents in the conveying direction associated with the stored transport units and the lengths of the storage lines can be stored in the controller, wherein the controller is configured to determine the free lengths of the respective storage lines from the lengths of the respective storage lines, from the number of stored transport units and from the associated extents in the conveying direction, and to control the first switch pointes in each case such that the first switch pointes store a transport unit in a storage line with a free length which is greater than or equal to the extent of the transport unit in the conveying direction determined by the measuring device. In a preferred embodiment, the storage lines extend as branches away from the feeding line, wherein the branches preferably extend away from the feeding line at right angles.

Through the determination of the free lengths of the storage lines, it is advantageously possible, on the basis of the determined extents of the transport units to be stored in the conveying direction, to firstly ensure that a transport unit is respectively stored in a storage line with sufficient available space and to secondly prevent that an available space of a storage line is not fully utilized.

The controller is preferably configured to, upon every actuation of a first switch point for the purposes of storing a transport unit in a storage line, record or update the present number of transport units stored in said storage line. Optionally, it is also possible for a respective counter device to be arranged on the storage lines or at the first switch pointes, which counter device counts the transport units stored in a storage line and transmits the number to the controller. Furthermore, the controller is preferably configured to, for each transmitted extent of stored transport units, record the associated storage line in which the respective transport unit has been stored, such that it is advantageously always the case that the present number of transport units, with the associated extents in the conveying direction, is stored in the controller.

Then, from the stored length of a storage line, from the present number of transport units stored in said storage line and from the associated extents in the conveying direction, the controller can easily respectively determine the free length of the storage line. The controller can thus advantageously ensure that a transport unit to be stored is stored in a storage line with sufficient free space, by virtue of the controller comparing the determined extent of said transport unit in the conveying direction with the free lengths of the storage lines. Furthermore, the controller can advantageously prevent that storage lines which would still have sufficient space for a transport unit remain unutilized for a relatively long period of time.

Since the capacity utilization of the storage lines can advantageously be controlled through the determination of the extent of the transport units, it is for example possible for a sensor for detecting a full state to be omitted, whereby it is possible inter alia to save on cabling.

There is therefore the advantage that the controller can always be up-to-date with regard to the fill level of the storage lines and with regard to the transport units to be stored and can correspondingly optimally control the storage of the transport units.

In particular embodiments, the measuring device may be configured to determine the extent of the transport units transversely, for example horizontally or perpendicularly, with respect to the conveying direction. This is advantageous if, for example for particular storage lines owing to the spacing of the storage lines to one another etc., a maximum admissible extent of transport units transversely with respect to the conveying direction is provided.

In particular embodiments, at least one capacity utilization sensor may be provided which determines the present free lengths of the storage lines and transmits these to the controller. The controller can then compare the extent of a transport unit in the conveying direction determined by the measuring device with the present free lengths of the storage lines and control the first switch pointes such that the first switch pointes store the transport unit in a storage line with a free length which is greater than or equal to the determined extent of the transport unit in the conveying direction.

The measuring device is preferably arranged upstream of the first switch pointes.

It is preferable for one common measuring device to be provided for all storage lines. The common measuring device offers the advantage that it is not necessary for a separate measuring device to be provided for each storage line, and the construction of the storage device can be simplified. Furthermore, the control architecture and thus the outlay on control can be reduced because all extents are determined, and transmitted to the controller, by the common measuring device. Furthermore, by means of the common measuring device, it is possible inter alia for cabling to be omitted, which considerably reduces the costs for the provision of the storage device. The arrangement of the measuring device is advantageously flexible, because it is merely necessary for the measuring device to be arranged upstream of the storage lines.

In one embodiment, the controller is configured to control the first switch pointes in each case such that a transport unit with an extent in the conveying direction which is greater than the free length of a storage line is led past said storage line by the first switch pointes.

In this way, it is possible to prevent that a transport unit is stored in a storage line in which insufficient space is present, which furthermore reduces the risk that, for example, a transport unit becomes caught in a switch point and a failure of the storage device thus occurs.

In one embodiment, the controller is configured to control the first switch pointes in each case such that the first switch pointes store the transport units in the respective storage lines in accordance with a storage plan stored in the controller.

The storage plan may, in one embodiment, comprise a distribution of extents across the storage lines. For example, by means of the storage plan, it may be provided that transport units with extents in a first range are stored in a first storage line, transport units with extents in a second range are stored in a second storage line, etc.

Furthermore, the storage plan may comprise a distribution of extents for a particular storage line. For example, for a particular storage line, it may be provided that transport units with a large extent, for example with a particular minimum extent, are firstly stored and, proceeding from a certain number of stored transport units, only transport units with a small extent, for example with a particular maximum extent, are stored.

Furthermore, the storage plan may comprise requirements with regard to the free lengths of the storage lines. For example, it may be provided by the storage plan that, proceeding from a particular free length of a storage line, no further transport units are stored in said storage line.

In one embodiment, the storage device comprises a discharge line which is connected by means of a respective second switch point to the storage lines.

In a preferred embodiment, the storage lines are arranged as branches between the feeding line and the discharge line, wherein the branches preferably extend away both from the feeding line and from the discharge line at right angles.

The transport units may be conveyed with variable or fixed spacings to one another in the feeding line and/or in the discharge line and/or in the storage lines, depending on the embodiment. In particular, the feeding line and/or the discharge line and/or the storage lines may be configured as gravity conveyor lines or as indexing conveyor lines.

In one embodiment, the storage lines comprise a respective release means for the controlled release of transport units from the storage line, which release means is connected to the controller.

The release means is preferably configured to release a transport unit from the storage line in response to a control command from the controller. By way of the release means, it is thus possible for an item for transport to be retrieved from a storage line in a controlled manner when said item for transport is required.

In one embodiment, the release means comprises a barrier which can be selectively introduced into the conveying path of the transport units, and retracted, transversely with respect to the conveying direction.

In one embodiment, the controller is configured to assign the storage lines a respective extent range, preferably in accordance with a storage plan stored in the controller, and to control the first switch pointes in each case such that a transport unit with an extent which lies in the extent range of a storage line is stored in said storage line by the first switch pointes.

This offers the advantage that the distribution of the transport units across the storage lines on the basis of the determined extents can be better controlled.

In one embodiment, the controller is configured to assign the storage lines in each case a number of extent ranges and to control the first switch pointes in each case such that a transport unit with an extent which lies in one of the extent ranges of a storage line is stored in said storage line by the first switch pointes.

This offers the advantage that the distribution of the transport units for a storage line can be configured in a variable manner. The number of extent ranges may be specified in a storage plan that can be stored in the controller.

In one embodiment, the controller is configured to, in the case of multiple storage lines in which a transport unit can be stored on the basis of the determined extent, select a storage line in accordance with a prioritization plan, stored in the controller, for the storage of the transport unit.

By means of the prioritization plan, in the case of a number of storage lines in which a transport unit can be stored, the controller can make a unique choice.

Alternatively, or in addition, the controller may, in the case of a number of storage lines in which a transport unit can be stored, perform a prioritization on the basis of the free lengths of the storage lines, for example by virtue of storage lines being selected for storage purposes in order of decreasing free length.

In one embodiment, the transport units each comprise an identification element, preferably a barcode, a QR code, an RFID tag or the like.

This offers the advantage that the transport units are identifiable. In particular, the unique identifications of the transport units can be stored in the controller, and the transport units can preferably be individually tracked.

In one embodiment, on the feeding line, there is arranged a readout device which is connected to the controller and which is configured to read out the identification element of a transport unit and to transmit the read-out information to the controller, wherein the controller is preferably configured to assign the read-out information to a determined extent of the transport unit.

In this way, in the controller, a determined extent can be linked to an identification of a transport unit. The readout device may be arranged immediately upstream or downstream of the measuring device. In this context, "immediately" means that, in general, after the readout by the readout device, the extent of the same transport unit is determined, or, after the determination of the extent by the measuring device, the identification element of the same transport unit is read out. The readout device and the measuring device may also be arranged at the same level in relation to the conveying direction, for example on opposite sides of the feeding line. In one embodiment, the readout device is integrated with the measuring device in a recording unit.

The readout device may for example comprise an RFID reader, a barcode reader, a QR code reader or the like.

In one embodiment, the transport units each comprise a carrying unit, preferably a bag, for carrying items for transport.

An item for transport may comprise one item or multiple items. A person skilled in the art understands the term "bags" generally to mean containers such as for example pouches, boxes, sacks, envelopes, baskets etc.

In further embodiments, the carrying units may comprise hooks, clothing hangers, frames, transport racks, clamps, grippers etc.

In one embodiment, the transport units each comprise a carriage to which the bags are respectively fastenable, wherein the carriage can preferably be conveyed in hanging fashion in the storage device.

The storage device may comprise at least one running rail on which the carriages can be conveyed.

The invention furthermore relates to a storage facility, comprising a storage device according to the present description and a loading station which is arranged on the feeding line and at which the transport units can each be loaded with items for transport.

In one embodiment of the storage facility, at the loading station, there is arranged an additional measuring device which is configured to determine the extent of the transport units after the loading with items for transport.

The transport units are typically configured such that the extent of the transport units is determined by the item for transport with which the transport unit is loaded. It is therefore advantageous to determine the extent of the transport units after the loading at the loading station.

If, after the measurement of the extent by the additional measuring device at the loading station, the item for transport moves in the transport unit while being conveyed, and thus the extent of the transport unit changes, for example because an item for transport such as a package tips over in a bag, the measuring device on the feeding line offers the advantage that the extent of the transport unit determined by the additional measuring device at the loading station can be checked. If the extent has changed since the measurement by the additional measuring device, the controller can replace the extent determined by the additional measuring device at the loading station with the extent determined by the measuring device on the feeding line.

The additional measuring device at the loading station preferably comprises a sensor which is configured to measure the extent of the transport units. In embodiments, the sensor may be an optical sensor, for example a camera, a light barrier, a light curtain, a light scanner or the like.

In one embodiment, a second readout device is arranged at the loading station.

In general, the transport units are loaded with items for transport in accordance with a loading plan, which is preferably stored in the controller. By means of the second readout device, it is thus possible in the controller, after the loading operation, for the information relating to the item for transport to be linked to the identification of the loaded transport unit.

If the items for transport are already assigned to the transport units by means of a second read-out device arranged at the loading station, the readout device arranged on the feeding line can provide the controller with information relating to the item for transport which is arranged in the transport unit that is to be stored. The information relating to the specific item for transport in the transport unit that is to be stored can therefore provide a criterion for the selection of a storage line in addition to the determined extent.

For example, it could be specified in a storage plan that items for transport with foodstuffs are to be stored in a first storage line and transport items with books are to be stored in a second storage line.

The invention furthermore relates to a method for operating a storage device according to the present description, comprising the steps: i) providing transport units loaded with items for transport in the feeding line; ii) determine an extent of a transport unit by means of the measuring device; iii) transmitting the determined extent to the controller by means of the measuring device; iv) selecting a storage line for storing the transport unit on the basis of the extent of the transport unit determined by the measuring device.

In one embodiment, the method furthermore comprises the steps: determine the extent of a transport unit in the conveying direction; storing the present number of transport units stored in the respective storage lines, the extents in the conveying direction associated with the stored transport units and the lengths of the storage lines in the controller; determining the free lengths of the respective storage lines from the lengths of the storage lines, from the number of stored transport units and from the associated extents in the conveying direction by means of the controller; controlling the first switch pointes by means of the controller such that the first switch pointes store a transport unit in a storage line with a free length which is greater than or equal to the extent of the transport unit in the conveying direction determined by the measuring device.

In one embodiment of the method, the controller controls the first switch pointes in each case such that a transport unit with an extent in the conveying direction which is greater than the free length of a storage line is led past said storage line by the first switch pointes.

In one embodiment of the method, the controller controls the first switch pointes in each case such that the first switch pointes store the transport units in the respective storage lines in accordance with a storage plan stored in the controller.

In one embodiment of the method, the controller assigns the storage lines a respective extent range, preferably in accordance with a storage plan stored in the controller, and controls the first switch pointes in each case such that a transport unit with an extent which lies in the extent range of a storage line is stored in said storage line by the first switch pointes.

In one embodiment of the method, the controller assigns the storage lines in each case a number of extent ranges and controls the first switch pointes in each case such that a transport unit with an extent which lies in one of the extent ranges of a storage line is stored in said storage line by the first switch pointes.

In one embodiment of the method, the controller, in the case of multiple storage lines in which a transport unit can be stored on the basis of the determined extent, selects a storage line in accordance with a prioritization plan, stored in the controller, for the storage of the transport unit.

BRIEF DESCRIPTION OF SEVERAL VIEWS OF THE DRAWINGS

Embodiments of the invention will be discussed in more detail on the basis of the following figures and the associated description. In the figures.

DETAILED DESCRIPTION OF THE INVENTION

In order to illustrate the invention, preferred embodiments will be described in more detail with reference to the figures.

Figure 1:
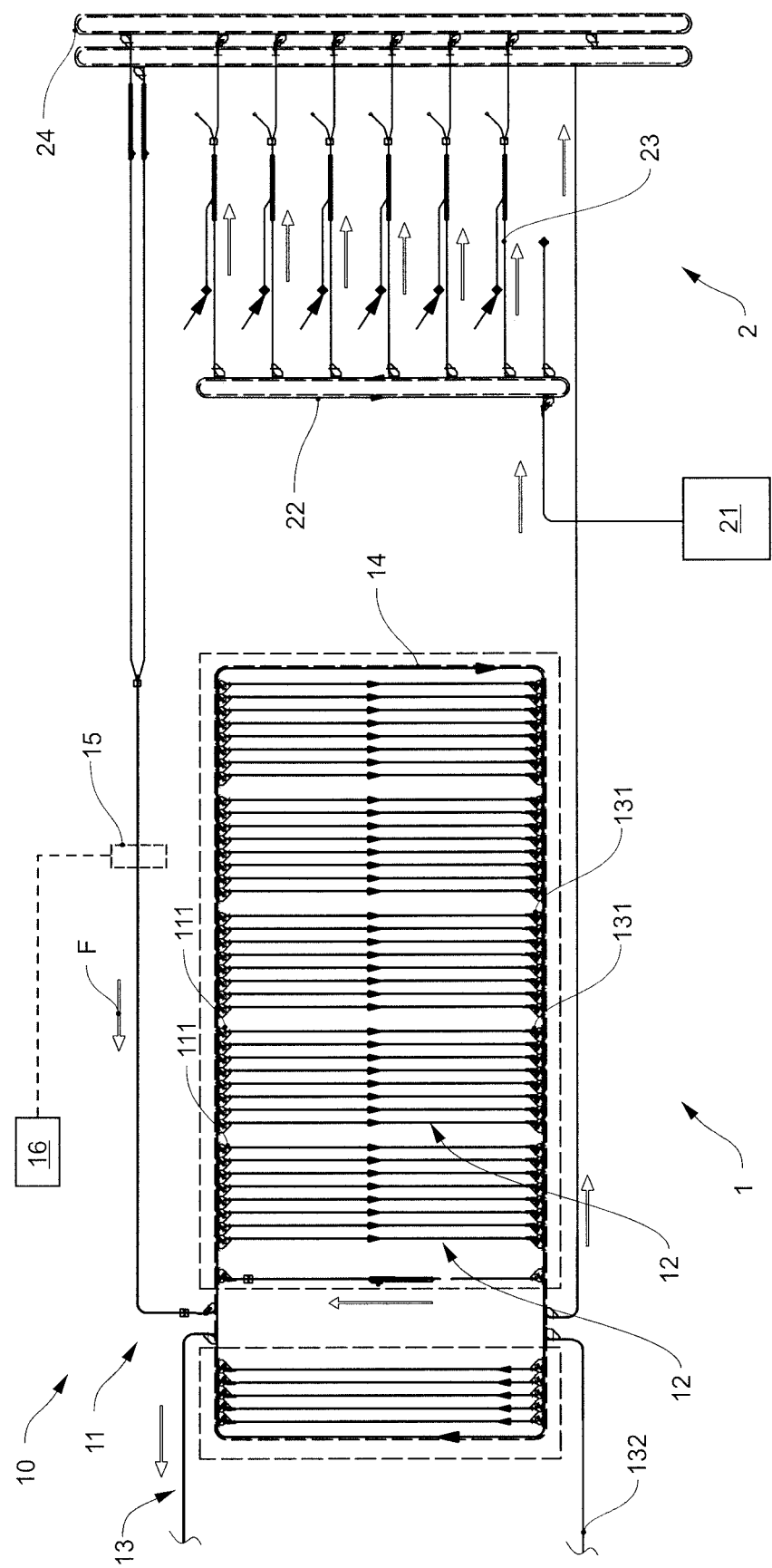
FIG. 1 is a schematic illustration of an embodiment of a storage facility.

FIG. 1 is a schematic illustration of an embodiment of a storage facility 10 comprising a storage device 1 and a loading station 2. The storage device 1 comprises a feeding line 11, which on the one hand connects the storage device 1 to the loading station 2 and on the other hand is connected by means of respective first switch pointes 111 to a number of storage lines 12 of the storage device 1. The storage lines 12 extend as branches arranged at right angles away from the feeding line 11. Furthermore, the storage device 1 comprises a discharge line 13, which is connected via second switch pointes 131 to the storage lines 12. The storage device 1 comprises a number of transport units which can be conveyed in the feeding line 11, the storage lines 12 and the discharge line 13 and which can be stored in the storage lines 12. The storage lines 12 are configured as gravity conveyor lines which have a gradient from the entrance at the first switch pointes 111 to the exit at the second switch pointes 131 and on which conveyed transport units move from the entrance to the exit of their own accord owing to gravitational force. A part of the feeding line 11 and a part of the discharge line 13 are in turn part of a circulating conveyor 14, wherein further feeding lines (not shown in FIG. 1) and discharge lines 132 may be connected to the circulating conveyor 14. On the feeding line 11, there is arranged a measuring device 15 which comprises a sensor, such as for example a light barrier, and which is configured to determine the extent of the transport units in particular in the conveying direction F.

The storage device 1 furthermore comprises a controller 16 which is connected to the measuring device 15 and to the first switch pointes 111 and the second switch pointes 131. The connection of the controller 16 to the measuring device 15 is symbolized by a dashed line. For the sake of better clarity, connection of the controller 16 to the first switch pointes 111 and the second switch pointes 131 is not illustrated. For example, it would be possible for the first switch pointes 111 and the second switch pointes 131 to be connected wirelessly to the controller 16.

The transport units are loaded with items for transport at the loading station 2. From an empties store 21, the transport units are conveyed by means of a circulating conveyor 22 to loading lines 23, along which the transport units are loaded with items for transport. The loading lines 23 are connected, at the exits, to a circulating conveyor 24, from which the loaded transport units pass onto the feeding line 11.

Figure 2:
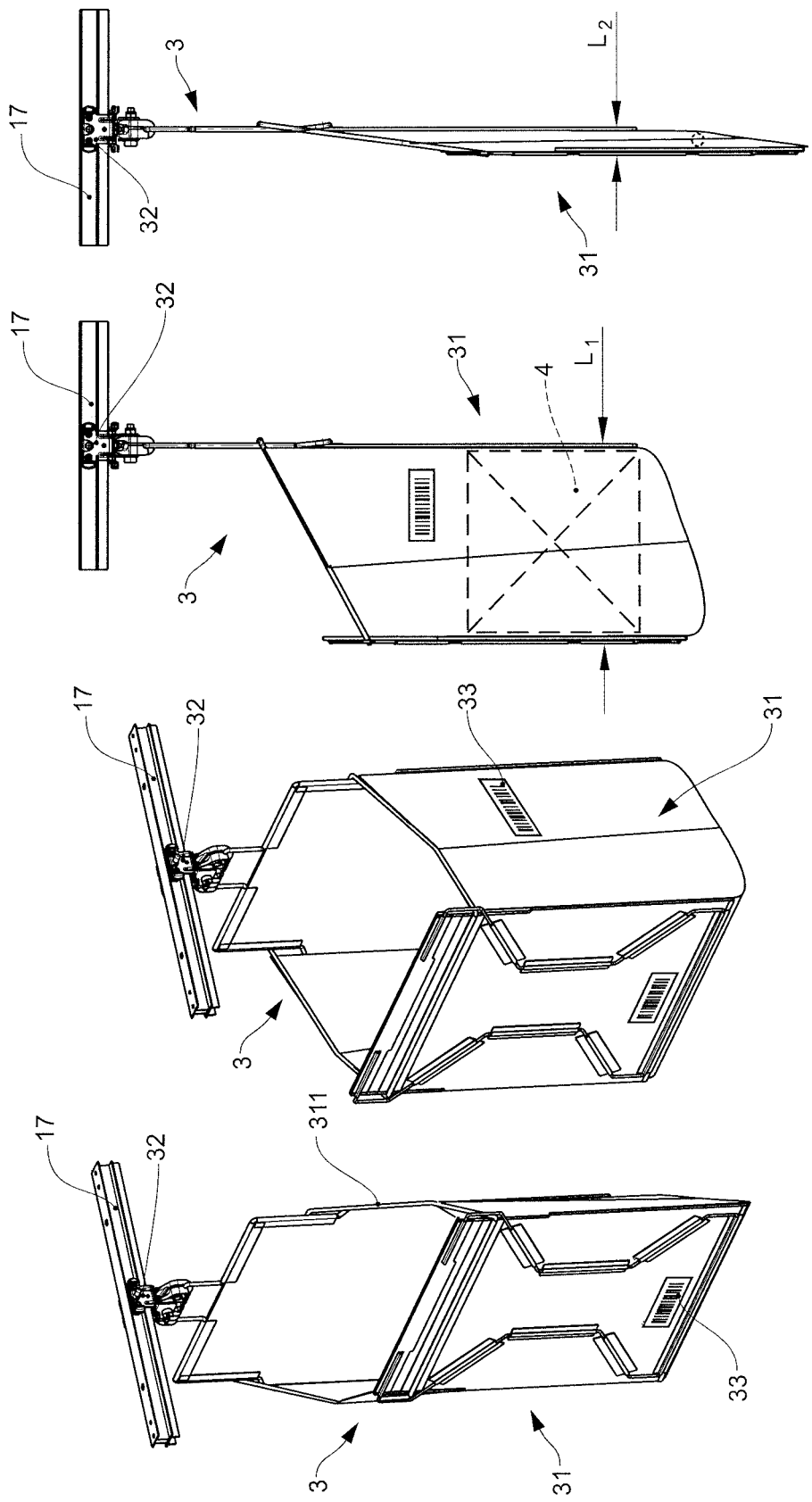
FIG. 2a shows a view of a transport unit with a detail of a running rail.
FIG. 2b shows another view of a transport unit with a detail of a running rail.
FIG. 2c shows another view of a transport unit with a detail of a running rail.
FIG. 2d shows another view of a transport unit with a detail of a running rail.

FIG. 2a-d shows various views of a transport unit 3 with a detail of a running rail 17. FIG. 2a shows a perspective view of the transport unit 3 in an empty state, that is to say without an item for transport. Transport unit 3 comprises a carrying unit, configured as a bag 31, for carrying items for transport. The bag 31 comprises a frame 311 which is of collapsible configuration such that the extent of the bag 31 in the conveying direction can be varied depending on the item for transport. Furthermore, the transport unit 3 comprises a carriage 32 which can be conveyed on the running rail 17 and to which the bag 31 is fastened. The bag 31 may be fastened detachably or fixedly to the carriage 32.

FIG. 2b shows the transport unit 3 from FIG. 2a in a configuration in which it has been loaded with an item for transport. In the perspective view shown, the item for transport is not visible because the item for transport has a height smaller than the height of the bag 31. In comparison to the configuration in FIG. 2a, it can be seen that the extent of the bag 31 in the conveying direction is greater, because the bag 31 has been loaded with an item for transport. FIG. 2c and FIG. 2d show the transport unit 3 with the bag 31 with an item for transport 4 (FIG. 2c) and without an item for transport 4 (FIG. 2d) in a side view. It can be seen that the extent of the transport unit 3 in the conveying direction is dependent on the loading of the transport unit 3 or of the bag 31 with items for transport 4. In the configurations shown, the extent L1 of the transport unit 3 loaded with items for transport 3 is greater than the extent L2 of the empty transport unit 3 or bag 31. In the configuration of the empty transport unit 3 or bag 31 shown in FIG. 3d, it can also be seen that the extent of the transport unit 3 in the conveying direction can be determined both by the extent of the bag 31 and by the extent of the carriage 32, because the bag 31 has been collapsed into a flat form.

Barcodes 33 have been applied as identification elements both to the front and to the side of the bag 31, which barcodes can be read out by means of a suitable readout device. The read-out identification can be transmitted by the readout device to the controller.

Figure 3:
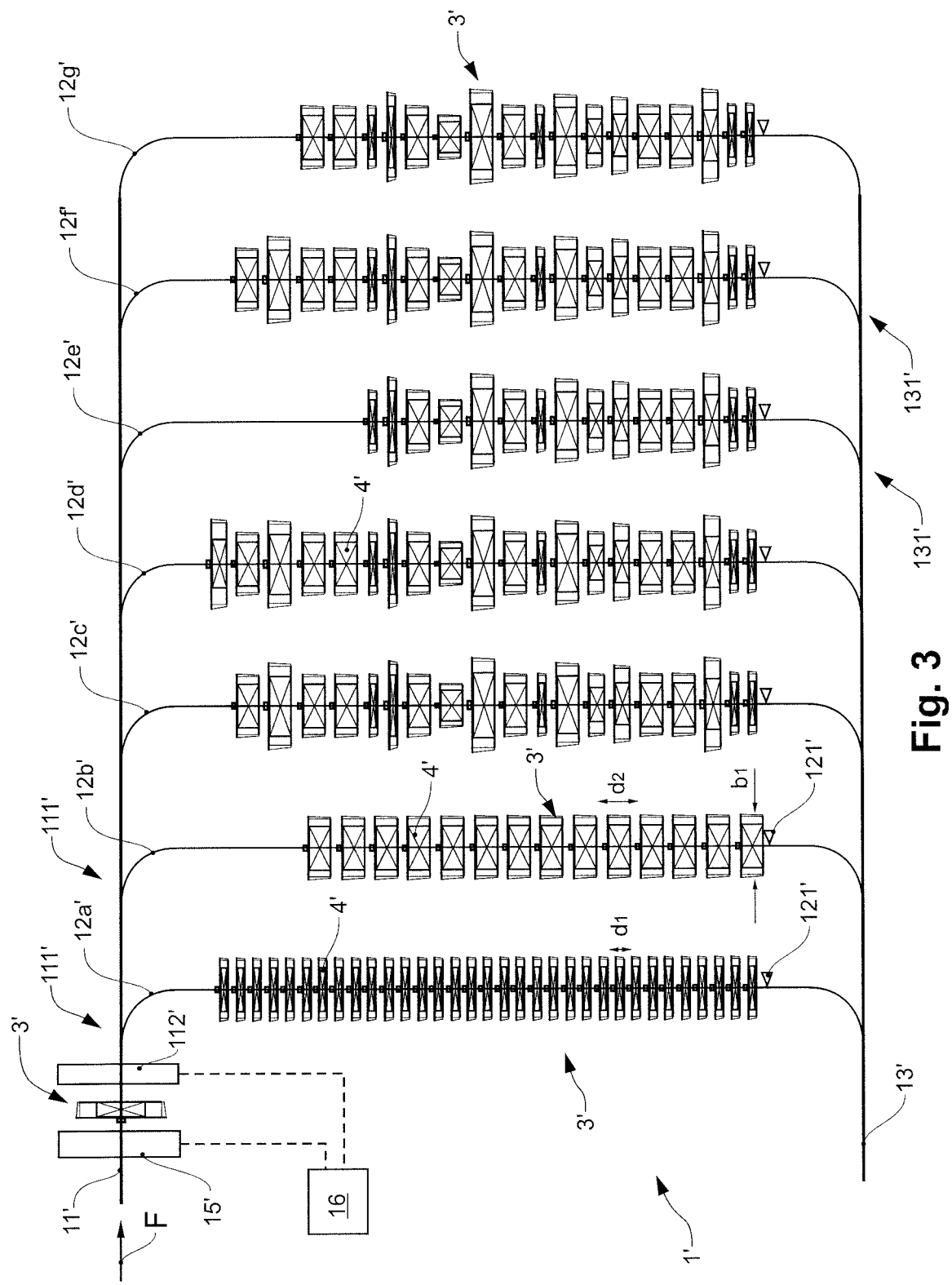
FIG. 3 is a schematic illustration of an embodiment of a storage device.

FIG. 3 is a schematic illustration of an embodiment of a storage device 1' with a feeding line 11', with a number of storage lines 12a'-12g', with a number of transport units 3' loaded with items for transport 4', with a discharge line 13' and with a controller 16'. In the example shown, the storage device 1' comprises seven storage lines 12a'-12g'. The feeding line 11' is connected by means of first switch pointes 111' to the storage lines 12a'-12g'. The discharge line 13' in turn is connected by means of second switch pointes 131' to the storage lines 12a'-12g'. A common sensor 15' is arranged on the feeding line 11' upstream of the first switch pointes 111', which sensor is configured to determine the extent of the transport units 3' in particular in the conveying direction F. The extent of a transport unit 3' in the conveying direction F is determined substantially by the respective item for transport 4'. The extents of the transport units 3' transversely with respect to the conveying direction also differ, but the extent is predefined substantially by the geometry of the bags of the transport units 3', and is not or is only insignificantly dependent on the items for transport. The extent, in the conveying direction F, of a transport unit 3' which is being conveyed past the sensor 15' is transmitted by the sensor 15' to the controller 16' which, on the basis of the determined extent, selects a storage line which has a free length greater than or equal to the determined extent of the transport unit 3' in the conveying direction F. The sensor 15' may also determine the extent of a transport unit 3' transversely with respect to the conveying direction F and transmit this to the controller 16'.

The free lengths of the storage lines 12a'-12g' are determined from the length of the respective storage lines 12a'-12g', from the number of transport units 3' stored in the respective storage lines 12a'-12g' and from the associated extents in the conveying direction, and are continuously updated, by the controller 16'. In the snapshot shown in FIG. 3, the storage line 12e' has the greatest free length, and the storage lines 12a' and 12d' have the smallest free lengths. Also stored in the controller 16' is a storage plan which comprises types of transport units 3' as a further criterion for the selection of a storage line. In the example shown, the storage plan comprises the criterion that only thin transport units 3a' with an extent in the conveying direction of less than, or less than or equal to, d1 should be stored in the first storage line 12a'. By contrast, relatively thick transport units 3b' with an extent in the conveying direction of greater than d1 but less than, or less than or equal to, d2 should be stored in the second storage line 12b'. Furthermore, the storage plan comprises a further criterion that only transport units 3a', 3b' with an extent transversely with respect to the conveying direction of less than b1 should be stored in the first two storage lines 12a' and 12b'. The further storage lines 12c'-12g' are mixed storage lines, for which no further specific criteria are comprised in the storage plan and which are selected solely on the basis of the comparison of the free length with the determined extent of a transport unit 3' in the conveying direction.

In the case of multiple storage lines in which the transport units 3' can be stored owing to a sufficient free length of the storage lines, a prioritization plan which specifies the sequence of the storage lines to be selected is stored in the controller 16'.

A release means 121' for the controlled release of transport units 3' is arranged on each storage line 12a'-12g' upstream of the second switch pointes 131'. The release means 121' is connected to the controller 16' and is configured to release a transport unit 3' from the storage line 12a'-12g' in response to a control command from the controller 16', for example when a particular item for transport 4' is required.

Furthermore, a readout device 112' configured as a barcode reader is arranged on the feeding line 11' immediately downstream of the sensor 15', which readout device is configured to read out an identification element of a transport unit 3' and to transmit the read-out identification to the controller 16'. The controller 16' assigns the read-out identification to the determined extent of the transport unit 3'. FIG. 3 shows, in the feeding line 11', a transport unit 3' which is situated between the sensor 15' and the readout device 112', that is to say downstream of the determination of the extent and upstream of the readout of the identification element.

Figure 4:
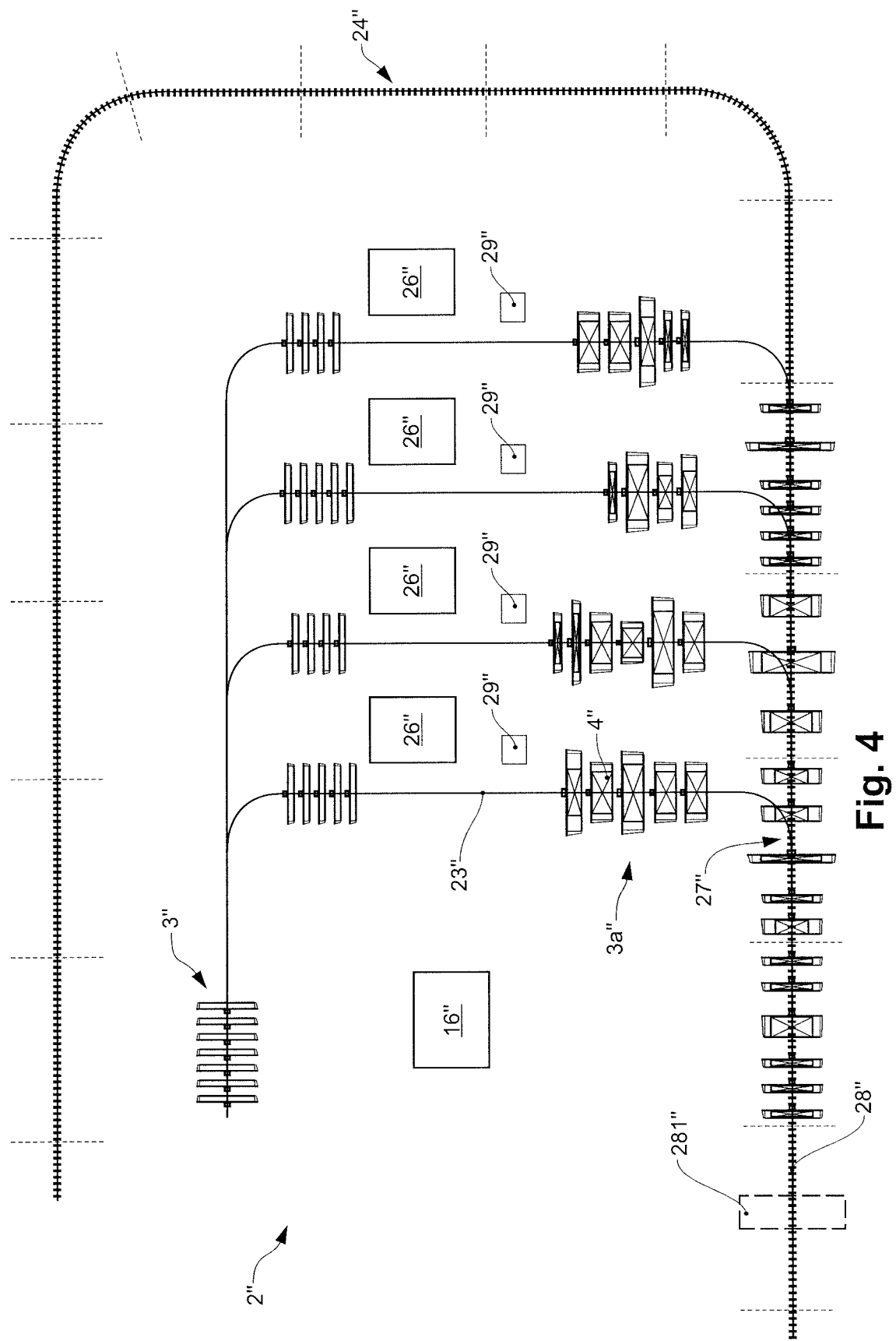
FIG. 4 is a schematic illustration of an embodiment of a loading station.

FIG. 4 is a schematic illustration of an embodiment of a loading station 2". Empty transport units 3" are fed to the loading station from an empties store. The loading station 2" comprises four loading lines 23", on which there is arranged in each case one loading device 26" by means of which the transport units 3" can be loaded with items for transport 4". The transport units 3a" that have been loaded with items for transport 4" are, by means of switch pointes 27", introduced directly onto a feeding line of the storage device or onto a connection line 28" which is connected to the feeding line of the storage device. The connection line 28" which is shown is part of a circulating conveyor 24", which is configured as an indexing conveyor. On the loading lines 23", downstream of the loading devices 26", there is arranged a respective readout device 29" which reads out the identification elements of the transport units 3a" and transmits the read-out identification to the controller 16". Information relating to the items for transport 4" with which the transport units 3a" have been loaded is also stored in the controller 16". Said information relating to the items for transport 4" can be transmitted for example by the loading devices 26" to the controller 16". Through the identification of the transport units 3a", the controller 16" can assign the transport units 3a" to the items for transport 4" with which the transport units 3a" have been loaded. On the connection line 28", there is furthermore arranged a second measuring device 281" which is configured to determine the extent of the transport units 3a" and to transmit this to the controller 16".

Figure 5:
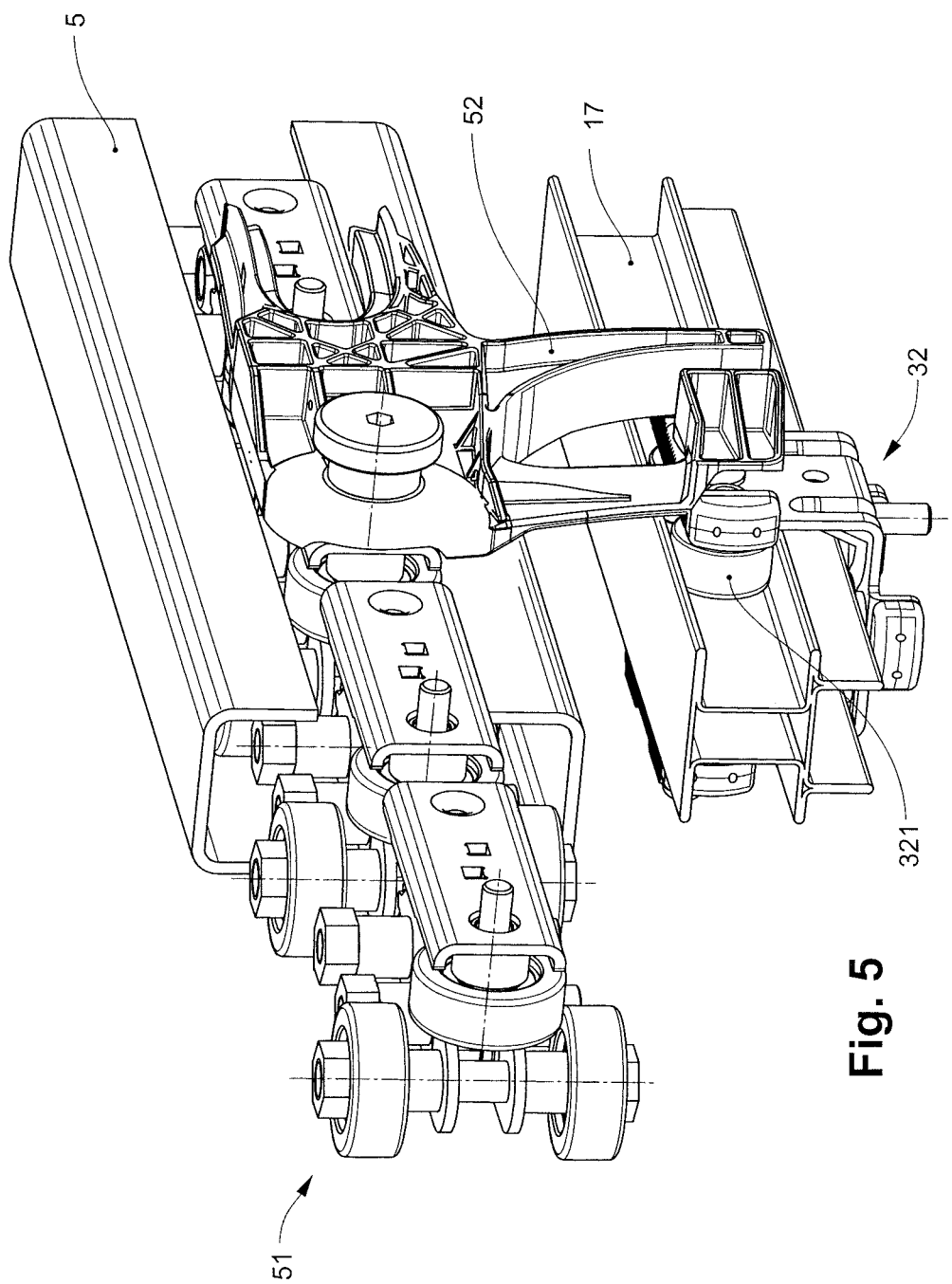
FIG. 5 shows a perspective view of a detail of a running rail with a carriage.

FIG. 5 shows a perspective view of a detail of a running rail 17 with a carriage 32. The carriage 32 is mounted by means of rollers 321 on the running rail 17. Arranged adjacent to the running rail 17 is a second rail 5 in which a conveying chain 51 is guided. The conveying chain 51 is in engagement with the carriage 32 by way of carriers 32 which protrude downwardly out of the second rail 5, such that a conveying movement of the conveying chain 51 causes a corresponding movement of the engaged carriage 32. Certain sections of the running rail 17 may also be configured without a second rail such that, in these sections, the carriages 32 are freely movable and can be conveyed for example by gravitational force.

Figure 6:
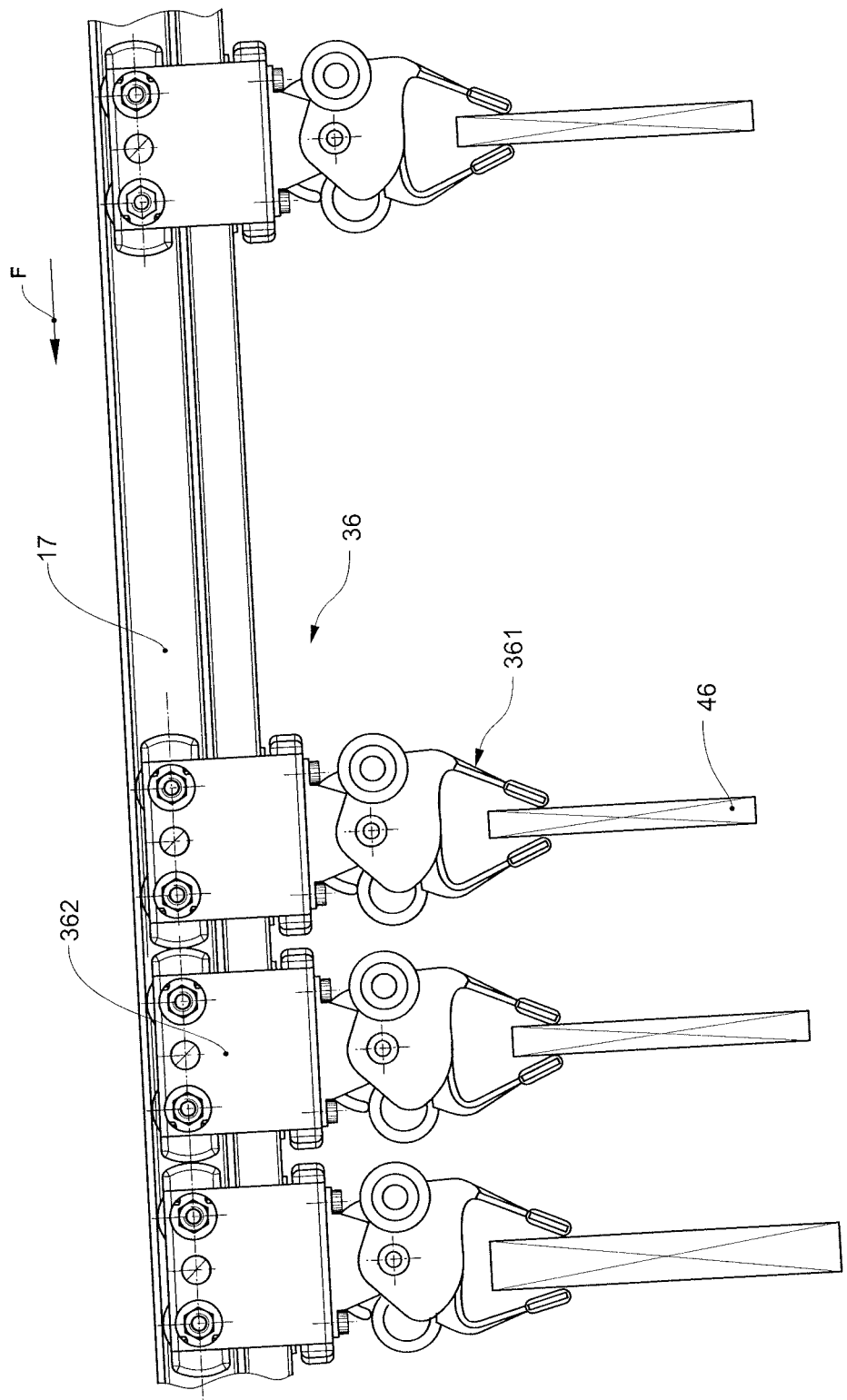
FIG. 6 shows a side view of a detail of a running rail with an embodiment of transport units.

FIG. 6 shows a side view of a detail of a running rail 17 with an embodiment of transport units 36 which can be conveyed in hanging fashion in the running rail 17. The transport units 36 each comprise a carriage 362, which carriages are mounted by means of rollers in the running rail 17. The carriages 362 can be conveyed with varying spacing to one another in the running rail 17 in the conveying direction F, for example by gravitational force. The detail shown may illustrate a detail of a feeding line, of a discharge line or of a storage line. The transport units 36 each comprise a carrying unit which is configured as a gripper 361, which carrying units are configured to grip items for transport 46, for example printed products such as books or magazines, boxes, packets, packages or the like. In the embodiment shown, the extent of the transport units 36 transversely, or in the situation shown horizontally, with respect to the conveying direction F is determined by the width of the items for transport 46, wherein the extent of the transport units 36 in the conveying direction F is determined substantially by the dimensions of the carriages 362 and/or of the grippers 361. In the case of carrying units configured as pockets, the extent of the transport units in the conveying direction is, by contrast, typically determined by the dimensions of the item for transport, wherein the extent transversely with respect to the conveying direction is generally predefined by the dimensions or the width of the bags. In FIG. 6, it can furthermore be seen that the items for transport 46 have different heights, which can be determined by means of a light scanner of the measuring device.

Figure 7:
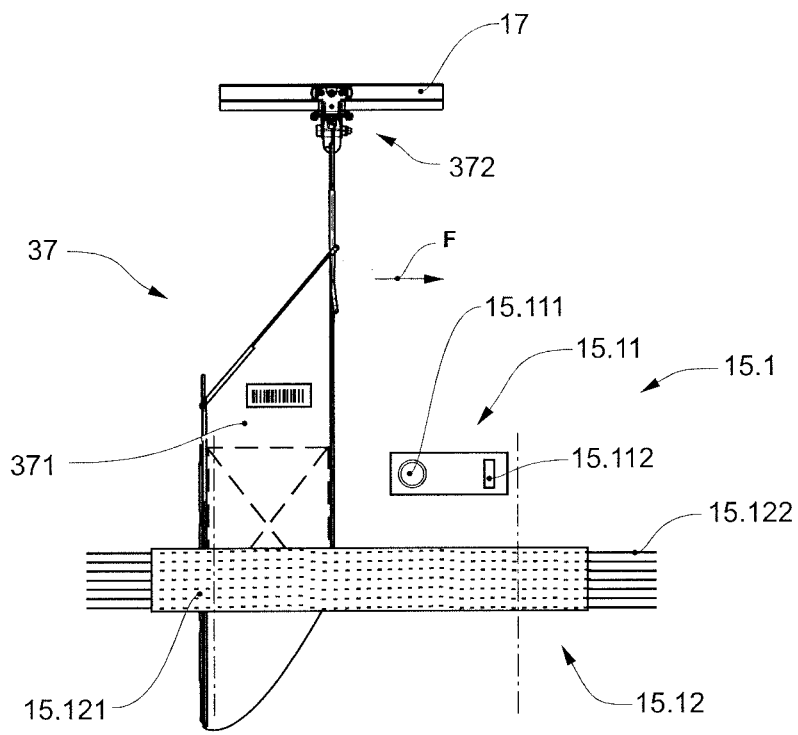
FIG. 7 shows a side view of an embodiment of a measuring device.

FIG. 7 shows a side view of an embodiment of a measuring device 15.1 comprising an optical sensor 15.11 and a guiding device 15.12. The optical sensor 15.11 is configured as a reflection-type light scanner and comprises a light source 15.111, for example an LED or a laser, and a detection unit 15.112, with for example a CCD (charge coupled device) or a CMOS (complementary metal-oxide semiconductor) detector. The reflection-type light scanner 15.11 is configured to determine the extent of a transport unit 37 in the conveying direction F as it moves past the reflection-type light scanner 15.11. The reflection-type light scanner 15.11 is arranged laterally with respect to the transport unit 37. The transport unit 37 comprises a bag 371 and a carriage 372 which is guided in a running rail 17. The guiding device 15.12 is arranged laterally on the feeding line and is configured to stabilize the transport unit 37 during the measurement of the extent by the reflection-type light scanner 15.11. Owing to the lateral arrangement with respect to the bag 371, the guiding device 15.12 stabilizes the transport unit 37 primarily transversely with respect to the conveying direction F. For this purpose, the guiding device 15.12 comprises, as a limiting body, a belt 15.121 which runs over rollers and on the outer surface of which brushes 15.122 are arranged. The belt 15.121 stabilizes the bag 371 by way of the brushes 15.122, which abut laterally against the bag 371. The brushes 15.121 thus serve as a stabilizing structure of the guiding device 15.12.

Figure 8:
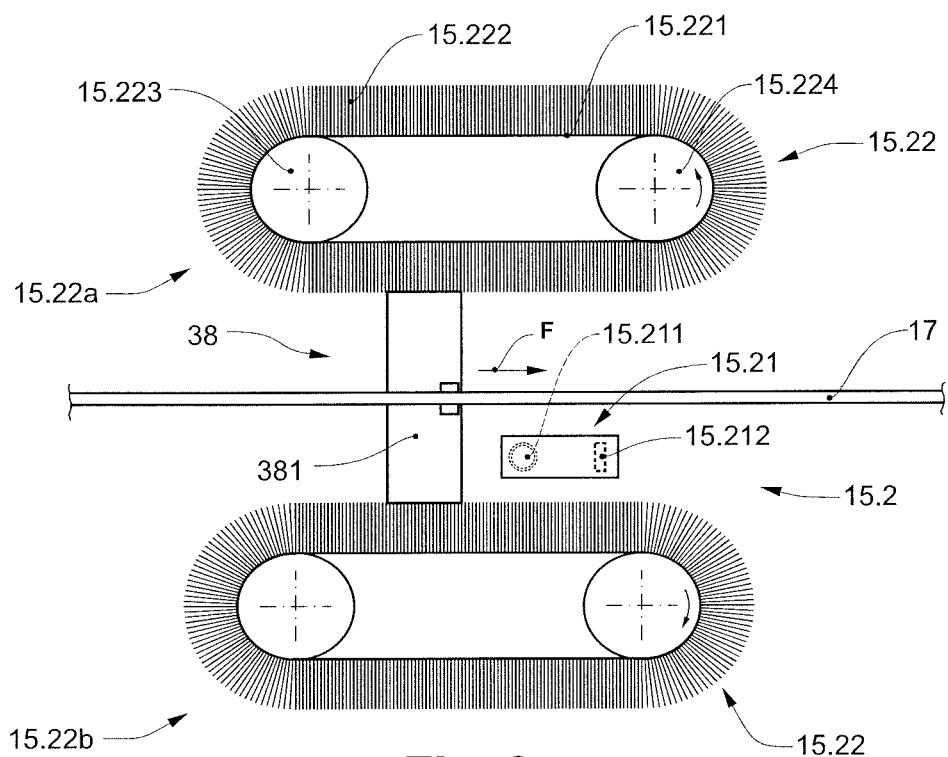
FIG. 8 shows a further embodiment of measuring device in a view from above.

FIG. 8 shows a further embodiment of a measuring device 15.2 in a view from above. The measuring device 15.2 comprises an optical sensor 15.21, which is configured as a reflection-type light scanner with a light source 15.211 and detection unit 15.212, and is arranged such that a bag 381 of a transport unit 38 moves past below the reflection-type light scanner 15.21. In the plan view of FIG. 8, the light source 15.211 and the detection unit 15.212 are correspondingly merely indicated by dashed lines. The reflection-type light scanner 15.21 is configured to determine the extent of the transport unit 38 or of the bag 381 in the conveying direction F as it moves past the reflection-type light scanner 15.21.

The measuring device 15.2 furthermore comprises a guiding device 15.22 with two limiting bodies 15.22a and 15.22b, which are arranged opposite one another laterally with respect to the feeding line or the running rail 17. The limiting bodies 15.22a and 15.22b each comprise a belt 15.221 which runs over two rollers 15.223 and 15.224 and on the outer surface of which brushes 15.222 are arranged. In FIG. 8, for a better overview, only the rollers 15.223 and 15.224 and belt 15.221 and brushes 15.222 of the limiting body 15.22a have been denoted by reference designations, and these have been omitted in the case of the limiting body 15.22b, which is of analogous configuration. At least one of the rollers 15.223 and 15.224 may be driven by a drive. Alternatively, the rollers 15.223 and 15.224 may be mounted in a non-driven manner. The limiting bodies 15.22a and 15.22b are arranged laterally with respect to the feeding line such that primarily the movement of the transport unit 38 in the two horizontal directions transversely with respect to the conveying direction F is limited. In this way, it is for example possible for lateral oscillatory movements of the bag 381, which can impair the accuracy of the measurement of the extent of the transport unit 38 or of the bag 381, to be minimized. The brushes 15.222 stand upright perpendicularly with respect to the outer surface of the belt 15.221 and act as a stabilizing structure for the bag 381. In the case of driven rollers 15.233 and/or 15.224, it is possible, by movement of the belt 15.221 by means of the rollers 15.223 and 15.224, for the transport unit 38 to be moved along in the conveying direction F, in addition to the stabilization, by way of the contact with the brushes 15.222. The brushes 15.222 therefore also serve as a carrier structure of the guiding device 15.22.

In FIG. 8, the extent of the transport unit 38 transversely with respect to the conveying direction F corresponds to the spacing between the brushes 15.222 of the limiting bodies 15.22a and 15.22b. In the case of greater extents of the transport unit 38 transversely with respect to the conveying direction F, the brushes can be correspondingly deformed or bent, such that suitable stabilization continues to be ensured.

Figure 9:
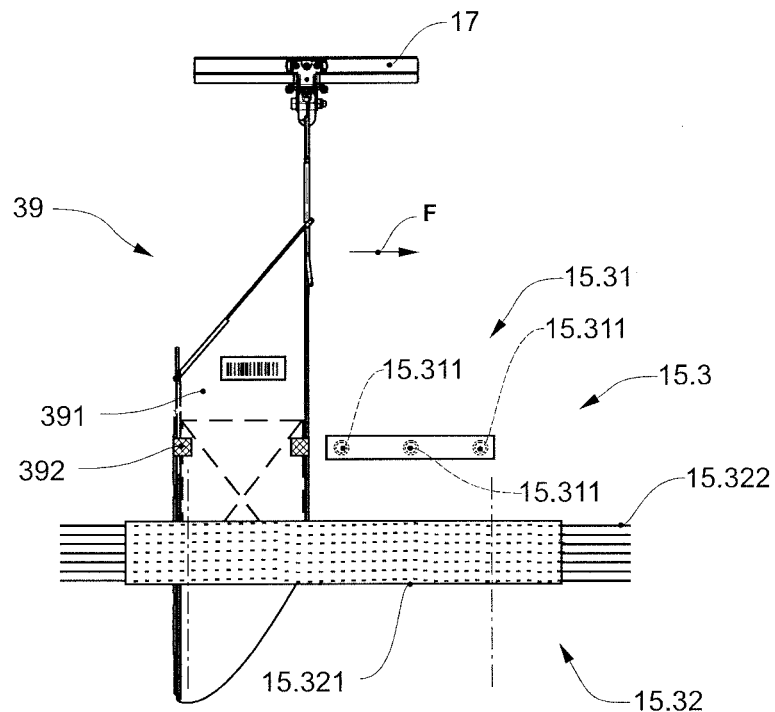
FIG. 9 shows a side view of a further embodiment of a measuring device.

FIG. 9 shows a side view of a further embodiment of a measuring device 15.3. The measuring device 15.3 comprises an optical sensor 15.31, which is configured as a reflection-type light barrier with three light sources 15.311. A transport unit 39 conveyed past the measuring device 15.3 comprises, on the bag 391, reflectors 392 on which the light emitted by the light sources 15.311 is reflected, which light is received again by a detection unit of the optical sensor 15.31 (not shown in FIG. 9). The number of light sources 15.311 forms a light curtain, whereby a more precise measurement of the extent of the transport unit 39 or of the bag 391 in the conveying direction F is made possible. In the arrangement shown in FIG. 9, the reflection-type light barrier 15.31 is arranged such that the light emitted by the light sources 15.311 is radiated into the plane of the drawing and the bag 391 is conveyed past behind the reflection-type light barrier 15.31 in relation to the plane of the drawing. The light sources 15.311 are correspondingly merely indicated by dashed lines.

The measuring device 15.3 furthermore has a guiding device 15.32, which corresponds to the guiding device 15.12 from FIG. 7, and a belt 15.321 which runs over rollers and on the outer surface of which brushes 15.322 are arranged.

Figure 10:
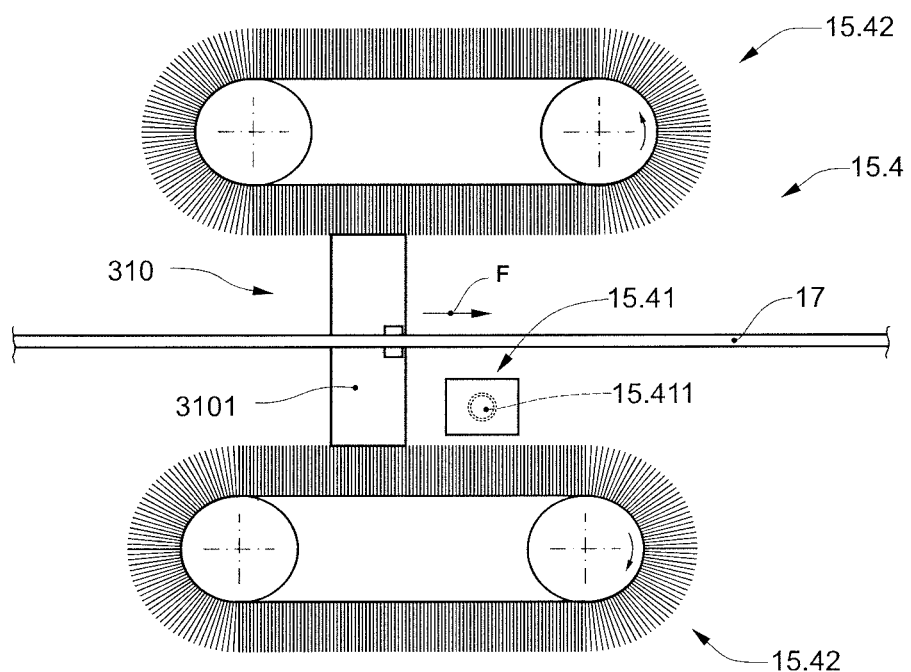
FIG. 10 shows a further embodiment of a measuring device in a view from above.

FIG. 10 shows a further embodiment of a measuring device 15.4 in a view from above. The measuring device 15.4 is designed substantially correspondingly to the measuring device 15.2 from FIG. 8 but comprises, as an optical sensor 15.41, a camera with a camera lens 15.411 which is arranged such that a bag 3101 of a transport unit 310 passing the measuring device 15.4 is moved past below the camera lens 15.411. In the plan view of FIG. 10, the camera lens 15.411 is correspondingly merely indicated by dashed lines. The camera 15.41 records a photographic image of the bag 3101 that is moving past, which image is evaluated by an evaluation unit of the measuring device 15.4 for the purposes of determining the extent of the bag 3101 in the conveying direction F. The measuring device 15.4 furthermore comprises a guiding device 15.42 which is designed correspondingly to the guiding device 15.22 from FIG. 8.

Figure 11:
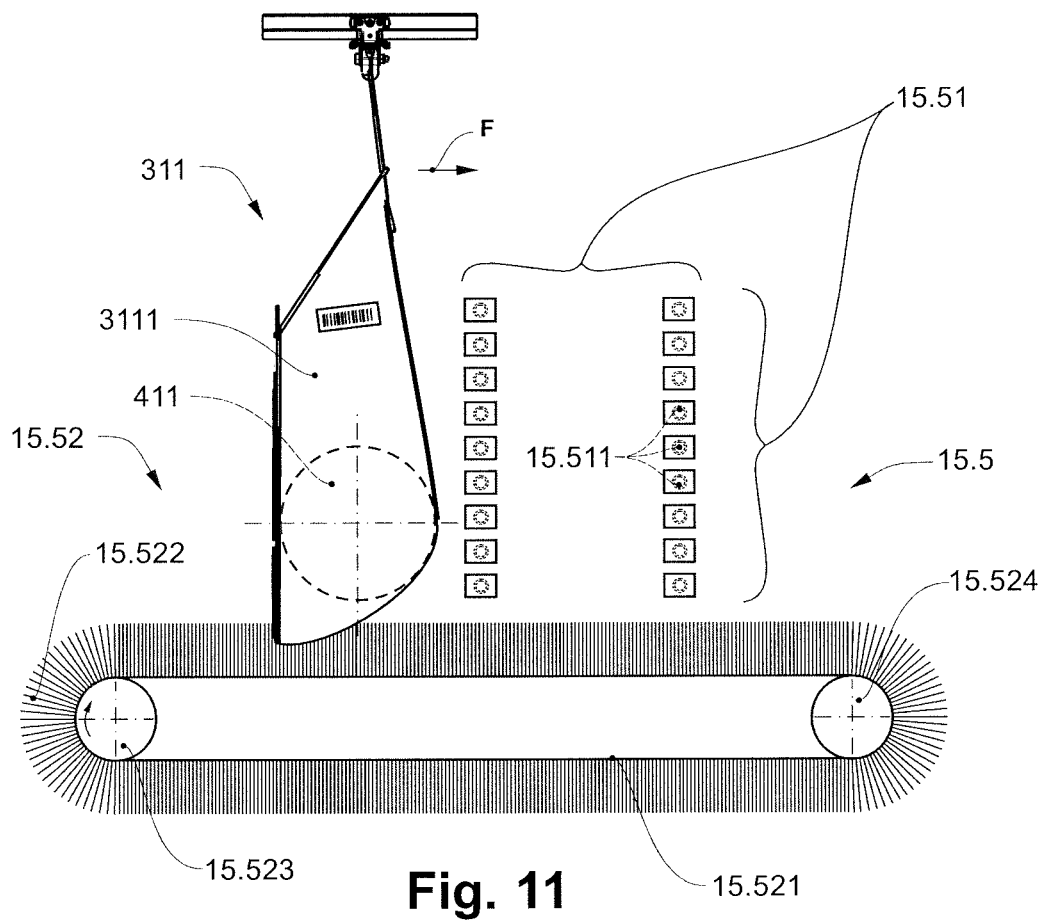
FIG. 11 shows a further embodiment of a measuring device in a side view.

FIG. 11 shows a further embodiment of a measuring device 15.5 in a side view. The measuring device 15.5 comprises a number of optical sensors 15.51 which are configured as light barriers with light sources 15.511 and which are arranged in two vertical lines arranged one behind the other in the conveying direction F. Within each line, a number of light barriers 15.51 are arranged vertically one above the other. The light barriers 15.51 with the light sources 15.511 thus form a matrix with two columns and nine rows, or two light curtains arranged one behind the other in the conveying direction F. By means of this arrangement, the extent of the bag 3111 of the transport unit 311 at different heights can be determined, and the extent of the bag 3111 in the conveying direction, which varies along the vertical direction owing to the shape of the item for transport 411, can be allowed for.

The measuring device 15.5 furthermore comprises a guiding device 15.52 which comprises a belt 15.521 arranged below the transport unit 311. The transport unit 311 lies indirectly on the belt 15.521 via brushes 15.522 arranged on the outer surface of the belt 15.521. The belt 15.521 is mounted so as to run freely over rollers 15.523 and 15.524, such that the belt 15.521 runs along with the transport unit 311 and stabilizes the bag 3111 during the determination of the extent of the transport unit 311 or of the bag 3111.

Figure 12:
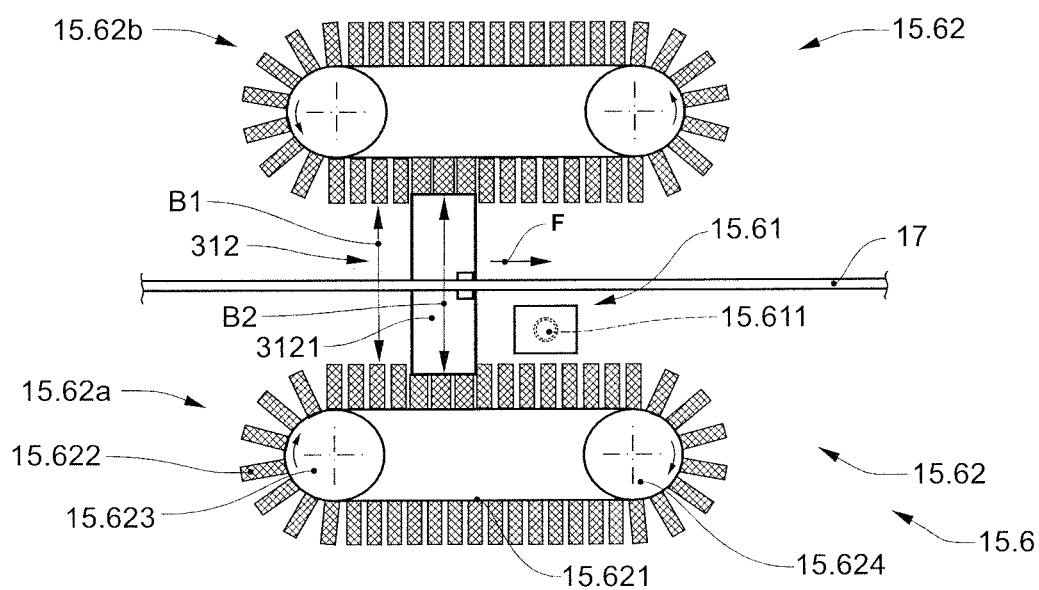
FIG. 12 shows a further embodiment of a measuring device in a view from above.

FIG. 12 shows a further embodiment of a measuring device 15.6 with an optical sensor 15.61 which, as in the embodiment of FIG. 10, comprises a camera with a camera lens 15.611. The measuring device 15.6 furthermore comprises a guiding device 15.62 with two limiting bodies 15.62a and 15.62b, which are arranged opposite one another laterally with respect to the feeding line or the running rail 17. The limiting bodies 15.62a and 15.62b each comprise a belt 15.621 which runs over two rollers 15.623 and 15.624.

By contrast to the embodiment of FIG. 10, foam elements 15.622 are arranged on the outer surface of the belt 15.621, which foam elements serve as a stabilizing structure. In FIG. 12, for a better overview, only the rollers 15.623 and 15.624 and belt 15.621 and foam elements 15.622 of the limiting body 15.62a have been denoted by reference designations, and these have been omitted in the case of the limiting body 15.62b, which is of analogous configuration. At least one of the rollers 15.623 and 15.624 may be driven by a drive. Alternatively, the rollers 15.623 and 15.624 may be mounted in a non-driven manner. In the case of rollers 15.623 and/or 15.624 which are driven by means of a drive, the foam elements 15.622 may also serve as a carrier structure of the guiding device 15.62 for the conveyance of the transport unit 312. As can be seen in FIG. 12, the width B2 of the bag 3121 is greater than the free spacing B1 between the foam elements 15.622 of the first limiting body 15.62a and of the second limiting body 15.62b. Owing to the flexibility of the foam elements 15.622, the foam elements 15.622 can adapt to the width B2 of the bag 3121 and stabilize the transport unit 312 or the bag 3121.

The invention claimed is:

1. A storage device (1, 1') for storing transport units (3, 3', 3", 3a", 36), comprising:
   a number of transport units (3, 3', 3", 3a", 36);
   a number of storage lines (12, 12a'-12g') which are configured to store transport units (3, 3', 3", 3a", 36-39, 310-312);
   a feeding line (11, 11') which is connected by a respective first switch point (111, 111') to the storage lines (12, 12a1-12g');
   a measuring device (15, 15', 15.1-15.6) which is arranged on the feeding line (11, 11') and which is configured to determine a respective extent (L1, L2) of a transport unit (3, 3', 3", 3a", 36-39, 310-312); and
   a controller (16, 16', 16") which is connected to the measuring device (15, 15', 15.1-15.6) and to the first switch points (111, 111') and which is configured to select a storage line (12, 12a'-12g') for storing the transport unit (3, 3', 3", 3a", 36-39, 310-312) on the basis of an extent (L1, L2) of the transport unit (3, 3', 3", 3a", 36-39, 310-312) determined by the measuring device (15, 15', 15.1-15.6), wherein
   the measuring device (15, 15', 15.1-15.6) is configured to determine the extent (L1, L2) of a transport unit (3, 3', 3", 3a", 36-39, 310-312) in a conveying direction (F), wherein the present number of transport units (3, 3', 3", 3a", 36-39, 310) stored in the respective storage lines (12, 12a'-12g'), the extent (L1, L2) in the conveying direction (F) associated with the stored transport units (3, 3', 3", 3a", 36-39, 310-312) and the lengths of the storage lines (12, 12a'-12g') is stored in the controller (16, 16', 16"), wherein the controller (16, 16', 16") is configured to determine free lengths of the respective storage lines (12, 12a'-12g') from the lengths of the respective storage lines (12, 12a'-12g'), from the number of stored transport units (3, 3', 3", 3a", 36-39, 310-312) and from the associated extents (L1, L2) in the conveying direction (F) and to control the first switch points (111, 111') in each case such that the first switch points (111, 111') store a transport unit (3, 3', 3", 3a", 36-39, 310-312) in a storage line (12, 12a'-12g') with a free length which is greater than or equal to the extent (L1, L2) of the transport unit (3, 3', 3", 3a", 36-39, 310-312) in the conveying direction (F) determined by the measuring device (15, 15', 15.1-15.6).

2. The storage device (1, 1') as claimed in claim 1, wherein the measuring device (15, 15') is arranged upstream of the first switch points (111, 111').

3. The storage device (1, 1') as claimed in claim 1, wherein the controller (16, 16', 16") is configured to control the first switch points (111, 111') in each case such that a transport unit (3, 3', 3", 3a", 36-39, 310-312) with an extent (L1, L2) in the conveying direction (F) which is greater than the free length of a storage line (12, 12a'-12g') is led past said storage line (12, 12a'-12g') by the first switch pointes (111, 111').

4. The storage device (1, 1') as claimed in claim 1, wherein the controller (16, 16', 16") is configured to control the first switch points (111, 111') in each case such that the first switch points (111, 111') store the transport units (3, 3', 3", 3a", 36-39, 310-312) in the respective storage lines (12, 12a'-12g) in accordance with a storage plan stored in the controller (16, 16', 16").

5. The storage device (1, 1') as claimed in claim 1, wherein the storage device (1, 1') comprises a discharge line (13, 13') which is connected by means of a respective second switch point (131, 131') to the storage lines (12, 12a'-12g').

6. The storage device (1, 1') as claimed in claim 1, wherein the controller (16, 16', 16") is configured to assign the storage lines (12, 12a'-12g') a respective extent range, and to control the first switch points (111, 111') in each case such that a transport unit (3, 3', 3", 3a", 36-39, 310-312) with an extent (L1, L2) which lies in the extent range of a storage line (12, 12a'-12g') is stored in said storage line (12, 12a'-12g') by the first switch points (111, 111').

7. The storage device (1, 1') as claimed in claim 1, wherein the controller (16, 16', 16") is configured to assign the storage lines (12, 12a'-12g') in each case a number of extent ranges and to control the first switch points (111, 111') in each case such that a transport unit (3, 3', 3", 3a", 36-39, 310-312) with an extent (L1, L2) which lies in one of the extent ranges of a storage line (12, 12a'-12g') is stored in said storage line (12, 12a'-12g') by the first switch points (111, 111').

8. The storage device (1, 1') as claimed in claim 1, wherein the controller (16, 16', 16") is configured to, in the case of multiple storage lines (12, 12a'-12g') in which a transport unit (3, 3', 3", 3a", 36-39, 310-312) can be stored on the basis of the determined extent (L1, L2), select a storage line (12, 12a'-12g') in accordance with a prioritization plan, stored in the controller (16, 16', 16"), for the storage of the transport unit (3, 3', 3", 3a", 36-39, 310-312).

9. The storage device as claimed in claim 1, wherein the measuring device (15.1-15.6) comprises an optical sensor (15.11-15.61), a light barrier (15.31, 15.51), a camera (15.41, 15.61), a light curtain (15.311, 15.511), a light grid, or a light scanner (15.11, 15.21).

10. The storage device (1, 1') as claimed in claim 1, wherein the transport units (3, 3', 3", 3a", 36-39, 310-312) each comprise at least one of a carrying unit (31, 361, 371-391, 3101, 3111, 3121), and a bag (31, 371-391, 3101, 3111, 3121), for carrying items for transport (4, 4', 4", 46, 411).

11. The storage device (1, 1') as claimed in claim 10, wherein the transport units (3, 3', 3", 3a", 36-39, 310-312) each comprise a carriage (32, 362, 372) to which the carrying units (31, 361, 371-391, 3101, 3111, 3121) are respectively fastenable, wherein the carriage (32, 362, 372) configured to be conveyed in hanging fashion in the storage device (1, 1').

12. The storage device (1, 1') as claimed in claim 1, wherein the transport units (3, 3', 3", 3a", 36-39, 310-312) each comprise at least one of an identification element, a barcode (33) and an RFID tag.

13. The storage device (1, 1') as claimed in claim 12, wherein, on the feeding line (11, 11'), there is arranged a readout device (112') which is connected to the controller (16, 16', 16") and which is configured to read out the identification element (33) of a transport unit (3, 3', 3", 3a", 36-39, 310-312) and to transmit the read-out information to the controller (16, 16', 16").

14. The storage device (1, 1') as claimed in claim 13, wherein the controller (16, 16', 16") is configured to assign the read-out information to an determined extent (L1, L2) of the transport unit (3, 3', 3", 3a", 36-39, 310-312).

15. The storage device as claimed in claim 1, wherein the measuring device (15.1-15.6) comprises a guiding device (15.12-15.62) which is configured to stabilize a transport unit (37-39, 310-312) during the determination of the extent by the measuring device (15.1-15.6).

16. The storage device as claimed in claim 15, wherein the guiding device (15.2, 15.6) comprises a drive which is configured to drive the guiding device (15.2, 15.6) for moving the transport unit along (37-39, 310-312).

17. The storage device as claimed in claim 15, wherein the guiding device (15.12-15.62) comprises at least one limiting body (15.22a, 15.22b, 15.62a, 15.62b) which is configured to limit a movement of the transport unit (37-39, 310-312), an oscillatory movement, horizontally transversely or longitudinally with respect to the conveying direction (F).

18. The storage device as claimed in claim 17, wherein the limiting body (15.22a, 15.22b, 15.62a, 15.62b) comprises a belt (15.121, 15.221, 15.321, 15.521, 15.621) which circulates over at least two rollers (15.223, 15.224, 15.523, 15.524, 15.623, 15.624) and which is configured to limit a movement of the transport unit (37-39, 310-312) transversely with respect to the belt (15.121, 15.221, 15.321, 15.521, 15.621).

19. The storage device as claimed in claim 18, wherein the belt (15.121, 15.221, 15.321, 15.521, 15.621) comprises at least one of a stabilizing structure and a carrier structure which is configured as at least one of brushes (15.122, 15.222, 15.322, 15.522) and foam elements (15.622) arranged on the outer surface of the belt (15.121, 15.221, 15.321, 15.521, 15.621), wherein the brushes (15.122, 15.222, 15.322, 15.522) and/or foam elements (15.622) are configured to stabilize the transport unit (37-39, 310-312) and move the latter along in the conveying direction (F).

20. A storage facility (10) comprising a storage device (1, 1') comprising a storage device (1, 1') for storing transport units (3, 3', 3", 3a", 36), comprising:
   a number of transport units (3, 3', 3", 3a", 36);
   a number of storage lines (12, 12a'-12g') which are configured to store transport units (3, 3', 3", 3a", 36-39, 310-312);
   a feeding line (11, 11') which is connected by a respective first switch point (111, 111') to the storage lines (12, 12a'-12g');
   a measuring device (15, 15', 15.1-15.6) which is arranged on the feeding line (11, 11') and which is configured to determine a respective extent (L1, L2) of a transport unit (3, 3', 3", 3a", 36-39, 310-312); and
   a controller (16, 16', 16") which is connected to the measuring device (15, 15', 15.1-15.6) and to the first switch points (111, 111') and which is configured to select a storage line (12, 12a'-12g') for storing the transport unit (3, 3', 3", 3a", 36-39, 310-312) on the basis of an extent (L1, L2) of the transport unit (3, 3', 3", 3a", 36-39, 310-312) determined by the measuring device (15, 15', 15.1-15.6), wherein
   the measuring device (15, 15', 15.1-15.6) is configured to determine the extent (L1, L2) of a transport unit (3, 3', 3", 3a", 36-39, 310-312) in a conveying direction (F), wherein the present number of transport units (3, 3', 3", 3a", 36-39, 310) stored in the respective storage lines (12, 12a'-12g'), the extent (L1, L2) in the conveying direction (F) associated with the stored transport units (3, 3', 3", 3a", 36-39, 310-312) and the lengths of the storage lines (12, 12a'-12g') is stored in the controller (16, 16', 16"), wherein the controller (16, 16', 16") is configured to determine free lengths of the respective storage lines (12, 12a'-12g') from the lengths of the respective storage lines (12, 12a'-12g'), from the number of stored transport units (3, 3', 3", 3a", 36-39, 310-312) and from the associated extents (L1, L2) in the conveying direction (F) and to control the first switch points (111, 111') in each case such that the first switch points (111, 111') store a transport unit (3, 3', 3", 3a", 36-39, 310-312) in a storage line (12, 12a'-12g') with a free length which is greater than or equal to the extent (L1, L2) of the transport unit (3, 3', 3", 3a", 36-39, 310-312) in the conveying direction (F) determined by the measuring device (15, 15', 15.1-15.6), and
   a loading station (2, 2") which is arranged on the feeding line (11, 11') and at which the transport units (3, 3', 3", 3a", 36-39, 310-312) can each be loaded with items for transport (4, 4', 4", 46, 411).

21. The storage facility (10) as claimed in claim 20, wherein, at the loading station (2, 2"), there is arranged a second measuring device (281") which is configured to determine the extent (L1, L2) of the transport units (3, 3', 3", 3a", 36-39, 310-312) after the loading with items for transport (4, 4', 4", 46, 411).

22. A method for operating a storage device (1, 1'), comprising the steps:
   i) providing a storage device (1, 1') for storing transport units (3, 3', 3", 3a", 36), comprising
   a number of transport units ((3, 3', 3", 3a", 36);
   a number of storage lines (12, 12a'-12g') which are configured to store transport units (3, 3', 3", 3a", 36-39, 310-312);
   a feeding line (11, 11') which is connected by a respective first switch point (111, 111') to the storage lines (12, 12a'-12g');

a measuring device (15, 15', 15.1-15.6) which is arranged on the feeding line (11, 11'); and a controller (16, 16', 16") which is connected to the measuring device (15, 15', 15.1-15.6) and to the first switch points (111, 111');

ii) providing transport units (3, 3', 3", 3a", 36-39, 310-312) loaded with items for transport (4, 4', 4", 46, 411) in the feeding line (11, 11');

iii) determining a respective extent (L1, L2) of a transport unit (3, 3', 3", 3a", 36-39, 310-312) by means of the measuring device (15, 15', 15.1-15.6) in the conveying direction (F) and iv) storing the present number of transport units (3, 3', 3", 3a", 36-39, 310-312) stored in the respective storage lines (12, 12a'-12g'), the extents (L1, L2) in the conveying direction (F) associated with the stored transport units (3, 3', 3", 3a", 36-39, 310-312) and the lengths of the storage lines (12, 12a'-12g') in the controller (16, 16', 16"); and v) determining the free lengths of the respective storage lines (12, 12a'-12g') from the lengths of the storage lines (12, 12a'-12g'), from the number of stored transport units (3, 3', 3", 3a", 36-39, 310-312) and from the associated extents (L1, L2) in the conveying direction (F) by means of the controller (16, 16', 16") and transmitting the determined extent (L1, L2) to the controller (16, 16'); and vi) selecting a storage line (12, 12a'-12g') for storing the transport unit (3, 3', 3", 3a", 36-39, 310-312) on the basis of the extent (L1, L2) of the transport unit (3, 3', 3", 3a", 36-39, 310-312) determined by the measuring device (15, 15', 15.1-15.6); and vii) controlling the first switch points (111, 111') by means of the controller (16, 16', 16") such that the first switch points (111, 111') store a transport unit (3, 3', 3", 3a", 36-39, 310-312) in a storage line (12, 12a'-12g') with a free length which is greater than or equal to the extent (L1, L2) of the transport unit (3, 3', 3", 3a", 36-39, 310-312) in the conveying direction (F) determined by the measuring device (15, 15', 15.1-15.6).

23. The method as claimed in claim 22, wherein the controller (16, 16', 16") controls the first switch points (111, 111') in each case such that a transport unit (3, 3', 3", 3a", 36-39, 310-312) with an extent (L1, L2) in the conveying direction (F) which is greater than the free length of a storage line (12, 12a'-12g') is led past said storage line (12, 12a'-12g') by the first switch pointes (111, 111').

24. The method as claimed in claim 22, wherein the controller (16, 16', 16") controls the first switch points (111, 111') in each case such that the first switch points (111, 111') store the transport units (3, 3', 3", 3a", 36-39, 310-312) in the respective storage lines (12, 12a'-12g) in accordance with a storage plan stored in the controller (16, 16', 16").

25. The method as claimed in claim 22, wherein the controller (16, 16', 16") assigns the storage lines (12, 12a'-12g') a respective extent range, and controls the first switch points (111, 111') in each case such that a transport unit (3, 3', 3", 3a", 36-39, 310-312) with an extent (L1, L2) which lies in the extent range of a storage line (12, 12a'-12g') is stored in said storage line (12, 12a'-12g') by the first switch points (111, 111').

26. The method as claimed in claim 22, wherein the controller (16, 16', 16") assigns the storage lines (12, 12a'-12g') in each case a number of extent ranges and controls the first switch points (111, 111') in each case such that that a transport unit (3, 3', 3", 3a", 36-39, 310-312) with an extent (L1, L2) which lies in the one of the extent ranges of a storage line (12, 12a'-12g') is stored in said storage line (12, 12a'-12g') by the first switch points (111, 111').

27. The method as claimed in claim 22, wherein the controller (16, 16', 16"), in the case of multiple storage lines (12, 12a'-12g') in which a transport unit (3, 3', 3", 3a", 36-39, 310-312) can be stored on the basis of the determined extent (L1, L2), selects a storage line (12, 12a'-12g') in accordance with a prioritization plan, stored in the controller (16, 16', 16"), for the storage of the transport unit (3, 3', 3", 3a", 36-39, 310-312).

* * * * *